United States Patent [11] 3,577,086

[72] Inventors Ivan M. Kliman
Glen Head;
Harold Smola, Carle Place, N.Y.
[21] Appl. No. 763,677
[22] Filed Sept. 30, 1968
[45] Patented May 4, 1971
[73] Assignee The United States of America as represented by the Secretary of the Army

[54] GENERATOR OF DELAYED SEQUENCES EMPLOYING SHIFT REGISTER TECHNIQUES

4 Claims, 6 Drawing Figs.

[52] U.S. Cl. .......... 328/62, 328/37, 328/55, 328/63
[51] Int. Cl. .......... H03k 5/00
[50] Field of Search .......... 328/62, 63, 55, 155, 37; 307/232, 262, 269, 221

[56] References Cited

UNITED STATES PATENTS 3,108,228 10/1963 Clapper .......... 328/63X

*Primary Examiner*—Donald D. Forrer
*Assistant Examiner*—John Zazworsky
*Attorneys*—Harry M. Saragovitz, Edward J. Kelly, Herbert Berl and Gordon W. Kerr

ABSTRACT: The circuitry involves a plurality of groups of shift register stages connected in cascade with temporary storage stages connected between each group of stages. A reference sequence is applied serially to the generator input and a number of substantially equally delayed replicas thereof are obtained from taps spaced along the generator, the number of the taps being different from the number of bits of the input reference sequence. In order to accomplish this, several different shift pulse trains must be applied to different of the groups of stages, the different shift pulse trains having different time delays or phases.

INVENTORS,
IVAN M. KLIMAN
HAROLD SMOLA.
BY: Gordon W. Kerr
Harry M. Saragovitz,
Edward J. Kelly &
Herbert Berl
ATTORNEYS INVENTORS,
IVAN M. KLIMAN
HAROLD SMOLA.
BY Gordon W. Kerr
Harry M. Saragovitz,
Edward J. Kelly &
Herbert Berl
ATTORNEYS.

FIG. 5

| DELAYED SEQUENCE NUMBER (REF.) | THEORETICAL TAP POSIT. RELATIVE TO REF. | ACTUAL TAP POSITION RELATIVE TO REF. | TAP POSITION SHIFT PULSE |
|---|---|---|---|
| 1 | 0.0 | 0 | 0 |
| 2 | 5.3 | 5 | 0 |
| 3 | 10.6 | 11 | 1 |
| 4 | 15.9 | 16 | 1 |
| 5 | 21.2 | 21 | 1 |
| 6 | 26.5 | 27 | 2 |
| 7 | 31.8 | 32 | 2 |
| 8 | 37.1 | 37 | 2 |
| 9 | 42.4 | 42 | 2 |
| 10 | 47.7 | 48 | 3 |
| 11 | 53 | 53 | 3 |
| 12 | 58.3 | 58 | 3 |
| 13 | 63.6 | 64 | 4 |
| 14 | 68.9 | 69 | 4 |
| 15 | 74.2 | 74 | 4 |
| 16 | 79.5 | 80 | 0 |
| 17 | 84.8 | 85 | 0 |
| 18 | 90.1 | 90 | 0 |
| 19 | 95.4 | 95 | 0 |
| 20 | 100.7 | 101 | 1 |
| 21 | 106 | 106 | 1 |
| 22 | 111.3 | 111 | 1 |
| 23 | 116.6 | 117 | 2 |
| 24 | 121.9 | 122 | 2 |
| 25 | 127.2 | 127 | 2 |
| 26 | 132.5 | 133 | 3 |
| 27 | 137.8 | 138 | 3 |
| 28 | 143.1 | 143 | 3 |
| 29 | 148.4 | 148 | 3 |
| 30 | 153.7 | 154 | 4 |
| 31 | 159 | 159 | 4 |
| 32 | 164.3 | 164 | 4 |
| 33 | 169.6 | 170 | 0 |
| 34 | 174.9 | 175 | 0 |
| 35 | 180.2 | 180 | 0 |
| 36 | 185.5 | 186 | 1 |
| 37 | 190.8 | 191 | 1 |
| 38 | 196.1 | 196 | 1 |
| 39 | 201.4 | 201 | 1 |
| 40 | 206.7 | 207 | 2 |
| 41 | 212 | 212 | 2 |
| 42 | 217.3 | 217 | 2 |
| 43 | 222.6 | 223 | 3 |
| 44 | 227.9 | 228 | 3 |
| 45 | 233.2 | 233 | 3 |
| 46 | 238.5 | 239 | 4 |
| 47 | 243.8 | 244 | 4 |
| 48 | 249.1 | 249 | 4 |
| 49 | 254.4 | 254 | 4 |
| 50 | 259.7 | 260 | 0 |

INVENTORS,
IVAN M. KLIMAN
HAROLD SMOLA.
BY: Gordon W. Kerr
Edward J. Kelly &
Herbert Berl
ATTORNEYS

GENERATOR OF DELAYED SEQUENCES EMPLOYING SHIFT REGISTER TECHNIQUES

This invention is concerned with circuitry and a technique for generating a plurality of differently delayed digital sequences or codes from a given reference input code. Each of the delayed sequences are replicas of the reference sequence, but each delayed sequence has a different time delay or phase relative to the reference. One prior art way of accomplishing this result is to apply the reference sequence to the input of an analog type delay line and locate taps at any desired positions along the line, the delayed sequences being obtained from the taps. Since these taps may be located anywhere along the analog line, the delay of any sequence can be any time interval, for instance, the delays may be nonintegral or fractional multiples of the bit interval or period of the input reference sequence. Shift register delay devices have numerous advantages over analog-type delay lines in that they are more reliable, stable, accurate, less costly and less massive. A simple shift register however, suffers from the disadvantage that the delay taps thereon must be located at discrete positions along the register, namely at the stages thereof, and hence these taps will comprise integral multiples of the reference sequence bit interval (or clock period) if the number of register stages equals the number of bits of the sequence. One way to provide a shift register with delay values which are fractional or nonintegral multiples of the reference clock period is to increase the number of shift register stages by a given factor and increase the register clock or shifting frequency by the same factor. Such a delay generator will be termed herein a multiplied shift register. Thus if the input reference sequence contains $x$ number of bits, the shift register would be provided with $m$ times $x$ number of stages and the shifting pulse frequency would be $m$ times that of the input reference sequence clock rate. With such an arrangement, one data bit of the reference sequence will span $m$ adjacent stages of the shift register while the entire reference sequence will span the entire register, thus providing the possibility of $m$ fractional delay taps for each bit of the reference sequence. Since each reference sequence bit is in effect shifted into and out of each register stage $m$ times during each cycle of the reference sequence, each delayed output sequence bit will contain $m$ switching transients, which degrades the quality of the output sequences, Also, the shift register must comprise a number of stages equal to $m$ times the number of bits of the input reference sequence, which leads to multiplication of the basic shift register circuitry. The present invention comprises a shift register-type generator of delayed sequences which accomplishes the same result as the multiplied shift register described above, but which comprises only a few more stages than there are bits in the input reference sequence and does not suffer from switching transients. Briefly stated, this generator comprises a plurality of groups of shift register stages arranged in cascade with each shift register group being separated by a temporary storage stage. The generator employs a staggered or phase shifted system of shifting pulses. All stages of the generator employ the same shifting frequency which is equal to the clock frequency of the input sequence, however, each succeeding group of stages employs shift pulses which are delayed relative to those of the preceding group of stages and the data is temporarily stored awaiting the arrival of the delayed shift pulse of the succeeding group. With this technique, a delayed sequence generator may be constructed which has a data bit capacity equal to that of the reference sequence, and has a number of approximately evenly spaced delay outputs different from said data bit capacity. This results in fractional or nonintegral delay values.

It is thus an object of this invention to provide an improved delayed sequence generator comprising shift register or digital circuitry.

Another object of the invention is to provide a shift register-type delayed sequence generator which has delay values which are nonintegral multiples of the input clock period and which comprises relatively simple circuitry.

These and other objects and advantages of the present invention will become apparent from the following detailed description and drawings, in which:

FIG. 5 is a table used in designing the circuitry of FIG. 2; and

Figure 1:
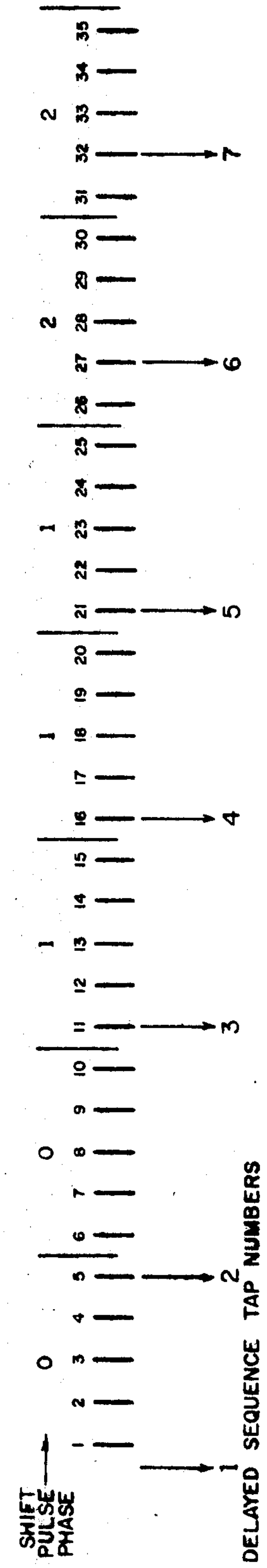
FIG. 1 is a symbolic diagram of a portion of a known type of shift register for accomplishing a similar purpose as does the present invention.
Figure 2:
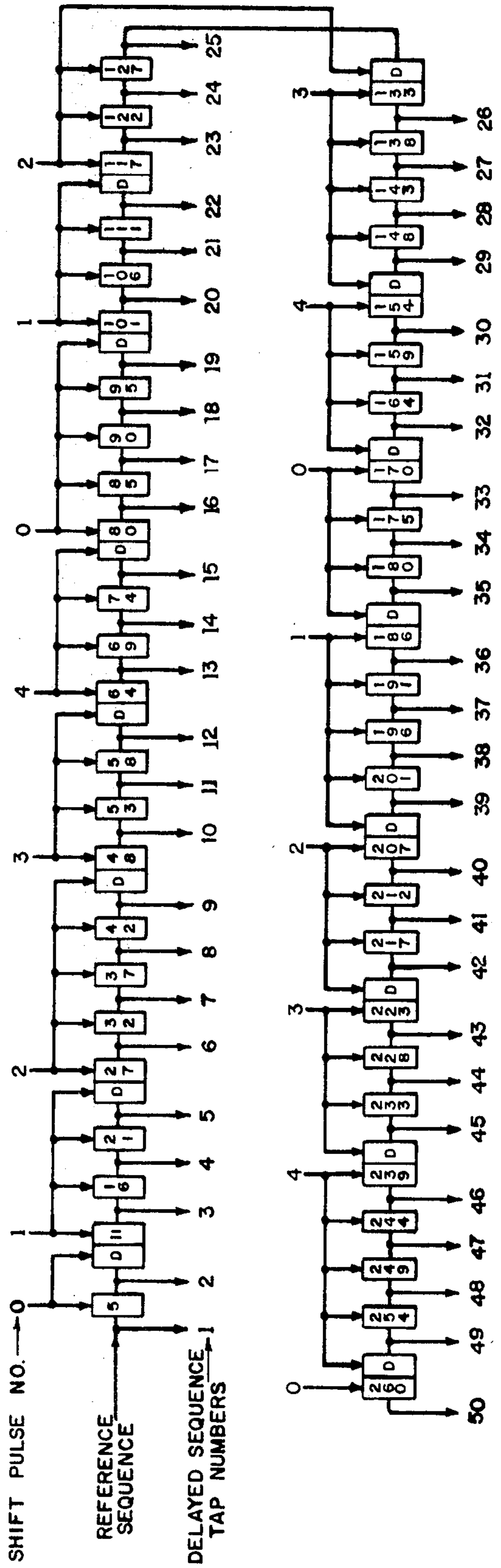
FIG. 2 is a diagram of a shift register-delayed sequence generator embodying the present invention.

In FIG. 1 the short vertical lines numbered 1 through 35 represent the first 35 stages of a shift register which contains 265 similar stages. This is a type of multiplied shift register referred to above which has $m$ times the number of the stages than there are bits in the reference sequence which would be applied serially to stage 1. For illustrative purposes only and not by way of limitation it will be assumed that the input reference sequence is a pseudorandom code containing 53 bits. Thus $m$ is equal to 5 in this example. The code length of 53 was dictated by mathematical considerations. The overall system of which the present delayed sequence generator is a part also includes correlation circuitry which requires 50 equally delayed replicas of the input reference sequence of 53 bits. It is obvious that a simple 53 bit shift register could provide only 53 evenly spaced taps or delayed sequences. By increasing the size of the register by a factor of $m$ (5) to 265 stages, as illustrated in FIG. 1, 50 evenly delayed output sequences would require taps every 5.3 stages; that is, a tap theoretically should be located at stages 5.3, 10.6, 15.9, 21.2, 26.5, 31.8 etc. However since taps can be located only at discrete register stages, the tap locations must be rounded off to the nearest integer. Thus the actual tap positions corresponding to the above theoretical tap positions would be 5, 11, 16, 21, 27 and 32. As a result of this rounding off the taps are not precisely evenly spaced, but the error is small. A tubulation of the theoretical and actual tap positions for the entire 265 stage register for each of the 50 delayed sequence outputs appears in FIG. 5. FIG. 1 graphically shows the actual tap positions by means of the downwardly pointing arrows labeled 'delayed sequence number.' As mentioned above, the hypothetical shift register of FIG. 1 would operate at a shifting frequency of $m$ or 5 times that of the input reference bit rate. It should be noted that the shift register of FIG. 1 is hypothetical circuitry used in designing the actual circuit of FIG. 2. Delayed sequence number 1 of FIG. 1 is the serial input to the shift register. Since the second tap (02) is located at stage 5 of the register, the bits appearing at this tap will be delayed relative to the 01 tap by 5 or $m$ times the shift register shifting or clock period. Since the shift register operates at $m$ times the input reference clock frequency, the delay between taps 01 and 02 is exactly the clock period of the input reference sequence. It can be seen that tap 03 is located at stage 11 or six stages beyond preceding tap 02. The forth tap at stage 16 is five stages beyond tap 03, the fifth tap is at stage 21 or five stages beyond its predecessor, while tap 06 is at stage 27, which is six stages from tap 05. A pattern can be seen in this sequence. Most of the taps are five stages apart but some are separated by six stages. This of course is due to the fact that 50 taps must be provided for the 265 stage register and thus the average tap separation must be more than 5 and in fact is exactly 5.3.

Figure 4:
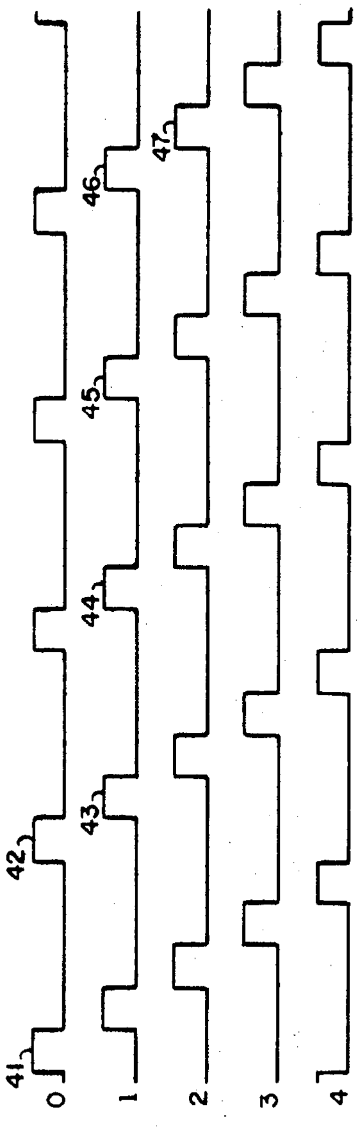
FIG. 4 are the waveforms at the outputs of FIG. 3.

The problem involved in the making of the present invention was the reduction in the amount of circuitry of the hypothetical circuit of FIG. 1, while accomplishing the same result. It will be apparent that all adjacent delay taps of FIG. 1 which are separated by five stages have delays equal to the clock period of the input reference sequence and therefore all of the untapped register stages of FIG. 1 which are between such taps can be eliminated if the shifting frequency is reduced by the factor of $m$ so that it equals the input clock rate. Thus stages 1 through 5 of FIG. 1 may be replaced by a single stage the output of which would constitute tap 02. A problem arises now with location of tap 03. It is seen in FIGS. 1 and 5 that tap 03 is located six stages or 1 1/5 of the input sequence clock period from tap 02. In order to provide for this extra delay between taps separated by six stages, all of the untapped stages between such taps are replaced by a delay stage, which may be of the same circuitry as the other register stages. The output of tap 02 would be transferred to this storage stage where it would remain until it were transferred to the stage 11, to which tap 03 is connected. The extra delay of $1/m$ of the input reference clock period is obtained by delaying the shifting pulses by $1/m$th of the reference clock period for each group of shift registers following a storage register. In the present example, this requires 5 or $m$ 21, pulse trains all staggered or phase shifted by 1/5 of a cycle from one another, as illustrated in FIG. 4. The five phases of shift pulses of FIG. 4 are labeled 0 through 4. Pulses 41 and 42 would be utilized to shift the first bit of the input reference pulse train between the input or tap 01 of FIG. 1 and stage 5 thereof where tap 02 is located, pulse 42 would then shift the contents of stage 5 to a temporary storage stage which would replace stages 6 through 10. The next group of shift register stages would operate on the phase 1 shift pulses which are delayed relative to the phase 0 pulses. Thus pulse 43 would transfer the contents of the temporary storage stage to stage 11, to which tap 03 is connected. It can be seen that the use of the delayed shift pulse train 1 has resulted in the proper delay between taps 2 and 3. The pulses 44 and 45 would then transfer the data bit to stages 16 and 2, all intervening stages having been eliminated. Since an extra delay is required between taps 05 and 06 another temporary stage would be required between stages 21 and 27 and stages 27, 32 etc. would operate on the phase 2 shifting pulses. The operation of the remainder of the delay generator will now be obvious and need not be described in detail. A block diagram of the complete resulting simplified generator for the illustrative case appears in FIG. 2. The active stages from which delayed sequences 02 through 50 are taken bear the same stage numbers (5, 11, 16, 21 etc.) as their counterparts in FIG. 1. All of the temporary delay stages are identified by the letter D. The appropriate shift pulse phases 0 through 4 are shown applied to the proper register stages via similarly numbered lines, these numbers correspond to the same numbers of FIGS. 3 and 4.

Figure 3:
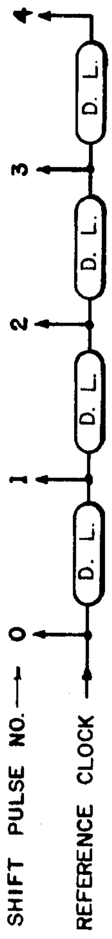
FIG. 3 is a diagram of the circuitry required to generate the staggered system of shifting pulses for the circuitry of FIG. 2.
Figure 6:
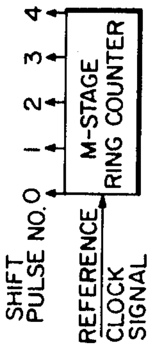
FIG. 6 is a block diagram of an M-stage ring counter.

FIG. 3 shows the circuitry required to generate the five shift pulse phases. The circuit comprises simply 4 cascaded delay lines DL with the input of the first one the clock signal of the reference sequence. Each of the delay lines has a delay equal to $1/m$th (or 1/5 in the present case) of the clock period. Thus $m$ evenly delayed pulse trains will appear at the outputs 0 through 4, as seen in FIG. 4. An $m$ stage ring counter, as shown in FIG. 6, may also be utilized to produce the required shift pulse phases, the counter being driven by the reference sequence clock signal and the $m$ shift pulse trains being obtained from the ring counter stages.

While the invention has been described in connection with an illustrative embodiment which involved specific numbers, the inventive concepts involved herein are of general application and hence the invention should be limited only by the scope of the appended claims.

We claim:

1. A generator of respective groups of delayed reference digital signal sequences occurring at a prescribed reference sequence clock signal frequency comprising, a plurality of groups of shift register stages arranged in cascade, a temporary storage stage connected respectively between each of said groups of shift registers, means to apply said reference digital signal sequences serially to said generator, and means to obtain substantially equally delayed replicas of said reference digital signal sequences from respective taps connected to a prescribed stage of each of said groups of shift register stages, means to apply shifting pulses of the same frequency as the reference sequence clock signal rate to said generator, each succeeding group of stages having applied thereto shift pulse trains which are delayed relative to those of the preceding group of stages.

2. The generator of claim 1 wherein said last-named means comprises a plurality of cascaded delay lines of equal length and having a single input terminal and respective output terminals for each of said delay lines, and means to apply said clock signal to said input terminal, said delayed shift pulse trains being obtained from said respective output terminals of each of said delay lines and across said input terminal.

3. The generator of claim 1 wherein said last-named means comprises a ring counter driven by said clock signal and having a plurality of prescribed output stages and wherein said delayed shift pulse trains are taken from said output stages.

4. The circuit of claim 1 wherein said generator comprises at least 14 of said groups of shift register stages and 15 of said temporary storage stages, and wherein each of said groups of reference digital signal sequences comprise 53 bits and wherein shifting pulse trains of five different phases or delays are applied to different of said groups of shift register stages, and wherein 50 substantially equally delayed replicas of said input reference digital signal sequences are obtained from said taps.